United States Patent [19]
Yokota

[11] Patent Number: 5,652,852
[45] Date of Patent: Jul. 29, 1997

[54] PROCESSOR FOR DISCRIMINATING BETWEEN COMPRESSED AND NON-COMPRESSED PROGRAM CODE, WITH PREFETCHING, DECODING AND EXECUTION OF COMPRESSED CODE IN PARALLEL WITH THE DECODING, WITH MODIFIED TARGET BRANCH ADDRESSES ACCOMMODATED AT RUN TIME

[75] Inventor: Masayuki Yokota, Yokohama, Japan

[73] Assignee: Canon Kabushiki Kaisha, Tokyo, Japan

[21] Appl. No.: 323,856

[22] Filed: Oct. 17, 1994

[30] Foreign Application Priority Data

Oct. 21, 1993 [JP] Japan .................................. 5-263304

[51] Int. Cl.$^6$ ....................................................... G06F 9/30
[52] U.S. Cl. ................................................ 395/384; 395/383
[58] Field of Search ................................. 395/700, 375, 395/384; 341/65

[56] References Cited

U.S. PATENT DOCUMENTS

| | | | |
|---|---|---|---|
| 5,237,460 | 8/1993 | Miller et al. | 360/18 |
| 5,313,614 | 5/1994 | Goettelmann et al. | 395/500 |
| 5,357,614 | 10/1994 | Pattisam et al. | 395/250 |
| 5,359,659 | 10/1994 | Rosenthal | 380/14 |
| 5,414,850 | 5/1995 | Whiting | 395/700 |

FOREIGN PATENT DOCUMENTS 55-131848  10/1980  Japan .................... G06F 9/06

OTHER PUBLICATIONS

Belk, Leland, L., "System Software", Addison-Wesley, 1990, pp. 124–129 (No Author) Motorola Microprocessors Data Manual, 1981, pp. 4–168, 4–169, 4–172 through 4–179. 08/087,045 US Application filed Jul. 7, 1993 Masayuki Yokota.
Koopman, Phil, "the WISC Concept: A proposal for a writable instruction set computer", BYTE, p. 187, vol. 12, No. 4 Apr. 1987.

*Primary Examiner*—Kevin A. Kriess
*Assistant Examiner*—St. John Courtenay, III
*Attorney, Agent, or Firm*—Fitzpatrick, Cella, Harper & Scinto

[57] ABSTRACT

When compressed program codes which are divided into modules in accordance with a branch instruction and its branching address are inputted to a processor, they are expanded by an expansion unit and decoded to an original (non-compressed) program codes. Timing of output of the decoded program codes to an execution control unit is controlled by a timing control unit. The execution control unit executes the program, and in a case where it is a branch instruction, the unit outputs its branching address by a memory management unit, and then the program is decoded by inputting the modules designated by said address and executed. Further, an instruction which indicates compressed codes versus non-compressed codes is included in the program codes. The instruction is read by an instruction discrimination unit where the instruction is discriminated as to whether or not it is in a compressed form. The program codes are decoded depending on the discrimination result.

29 Claims, 9 Drawing Sheets

PROCESSOR FOR DISCRIMINATING BETWEEN COMPRESSED AND NON-COMPRESSED PROGRAM CODE, WITH PREFETCHING, DECODING AND EXECUTION OF COMPRESSED CODE IN PARALLEL WITH THE DECODING, WITH MODIFIED TARGET BRANCH ADDRESSES ACCOMMODATED AT RUN TIME

BACKGROUND OF THE INVENTION

The present invention relates to a processor and, more particularly, to a processor which executes a compressed program.

Conventionally, there has not existed a processor capable of decoding and executing a compressed instruction or operand data directly.

FIG. 5 shows an example of a conventional processor. The processor 501 comprises a bus input/output control unit 102 which controls input and output between the processor and an external bus, an instruction pre-fetch unit 503 which reads instructions from an external memory and performs processes such as cache-ing, an instruction decoder 504 which decodes the pre-fetched instruction, a micro control unit 505 which controls processes based on the decoded instruction, and an execution unit 506 which executes the instruction controlled by the micro control unit 505. The processor further comprises a memory management unit 108, an internal bus 113 used for storing the execution result in an external memory or the like, an address bus 109 for accessing to an external bus, a data bus 110, and a control bus 111. With the construction described above, the processor reads an instruction code stored in an external memory, and decodes and executes the instruction.

In a system which executes a program by loading it via a network, there is a need to store and transfer the program after compressing it for:

shortening time to transmit the program; and
making the size of the program smaller.

One of the most famous compressing methods is the well-known Lempel-Ziv (LZ) coding method.

According to the LZ coding method, a computer or a terminal to execute a compressed program loads and expands the program, then executes it in the above-described processor.

After loading of the program, it is stored in a file server in the network in the expanded form, in a case where the program needs to be executed immediately.

Regarding a program stored in the processor, the size of the program has a tendency to expand, to improve a user interface and functions to a large capacity, and thus a memory having large capacity becomes necessary.

However, in the conventional computers and terminals for executing programs, processes of loading and expanding a compressed program can not be avoided to execute the program, and there is much inconvenience when real-time processing is taken into consideration. Further, to execute a program after expanding it, a work memory for expanding it is necessary beside the memory for loading, thus the required capacity of the memory has been increasing.

Furthermore, a program stored in the file server in the network can be executed immediately if it is stored in the non-compressed form; however, there arise problems such that more space of a disk of the file server is consumed, it takes a while to load the program, and a memory having large capacity is required in a computer or a terminal which execute the program.

Further, regarding the program stored in the processor, a memory having large capacity is necessary for improving a user interface and functions. Therefore, there is a problem that a memory of large capacity is necessary to provide convenient circumstances for a user. This prevents miniaturization in size and weight of the processor, and reduction of consumption of electricity by the processor, further prevents the reduction of cost of the processor.

SUMMARY OF THE INVENTION

The present invention has been made in consideration of the above situation, and has as its object to provide the processor which is able to execute the compressed program in real-time, capable of:

(1) high-speed and real-time execution of a compressed program;
(2) high-speed loading of the program;
(3) reducing capacity requirement of a storage memory;
(4) reducing capacity requirement of a memory for execution;
(5) reducing capacity requirement of a work memory for expansion;
(6) reducing capacity requirement of a file;
(7) increasing battery operation time by reducing consumption of electricity;
(8) miniaturizing in size and weight, and reducing cost by composing the processor with a memory having smaller capacity, a file having smaller capacity, and by reducing consumption of electricity; and
(9) executing both a compressed program and a non-compressed program.

To achieve the aforementioned object, the processor of the present invention has the following construction: A input means for inputting program codes including compressed program codes; decoding means for decoding the compressed program codes inputted by said input means into non-compressed program codes; execution means for executing-the non-compressed program codes decoded by said decoding means; and designating means for designating an address of compressed program codes which will be inputted next by said input means, based on the program codes executed by said execution means.

The foregoing object is also attained by providing a processor which is configured up-stream of a CPU, and is a pre-processor of the CPU, comprising: a CPU control unit, provided in up-stream of the CPU which interprets and executes an instruction by micro instruction control, for synchronizing the processor with said CPU on the basis of an address signal from said CPU, a control signal and a data signal; a bus input/output control unit for inputting/outputting instruction data and data from/to an external bus; a memory management unit for managing accesses to a memory; and a decoding unit, wherein said decoding unit comprises a pre-fetch unit for receiving an instruction and operand data from said bus input/output control unit, a instruction discrimination unit for discriminating whether the instruction and operand data are compressed the program codes or the non-compressed program codes, namely executable program codes, and for switching devices to which the instruction and the operand data are to be outputted, and an expansion unit for expanding the instruction and the operand data.

According to the present invention having the construction described above, an entire program which includes compressed instructions need not be expanded before executing it. Further, capacity of a file and a storage memory, such as a ROM, for storing the program can be reduced, whereby the program is able to be executed with memories having smaller capacity. Furthermore, the program can be stored in the compressed form in a file server and also be loaded in the compressed form, and thus the time for loading the program can be shortened, and real-time execution of the program becomes possible.

Further, by providing an expansion unit for expanding compressed instructions in real time as a pre-processor up-stream of the conventional processor, a processor capable of direct decoding and execution of the compressed program can be formed.

According to the construction described above,the following become possible:

(1) high-speed and real-time execution of a compressed program;

(2) high-speed loading of the program;

(3) reducing capacity requirement of a storage memory;

(4) reducing capacity requirement of a memory for execution;

(5) reducing capacity requirement of a work memory for expansion;

(6) reducing capacity requirement of a file;

(7) increasing battery operation time by reducing consumption of electricity;

(8) miniaturizing in size and weight, and reducing cost by composing the processor with a memory having smaller capacity, a file having smaller capacity, and by reducing consumption of electricity; and (9) executing both a compressed program and a non-compressed program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

[First Embodiment]

Figure 1:
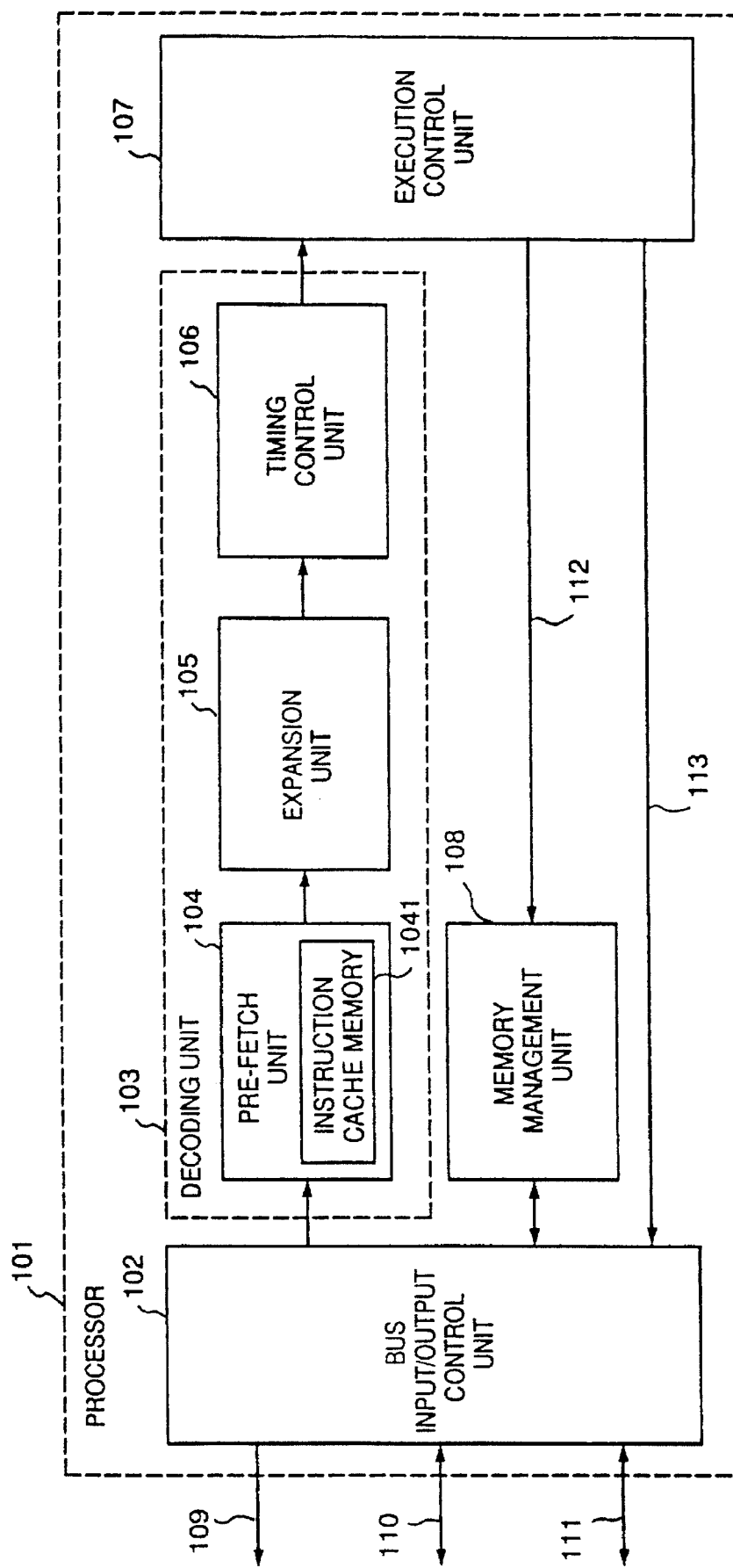
FIG. 1 is a block diagram of the processor according to a first embodiment.
Figure 5:
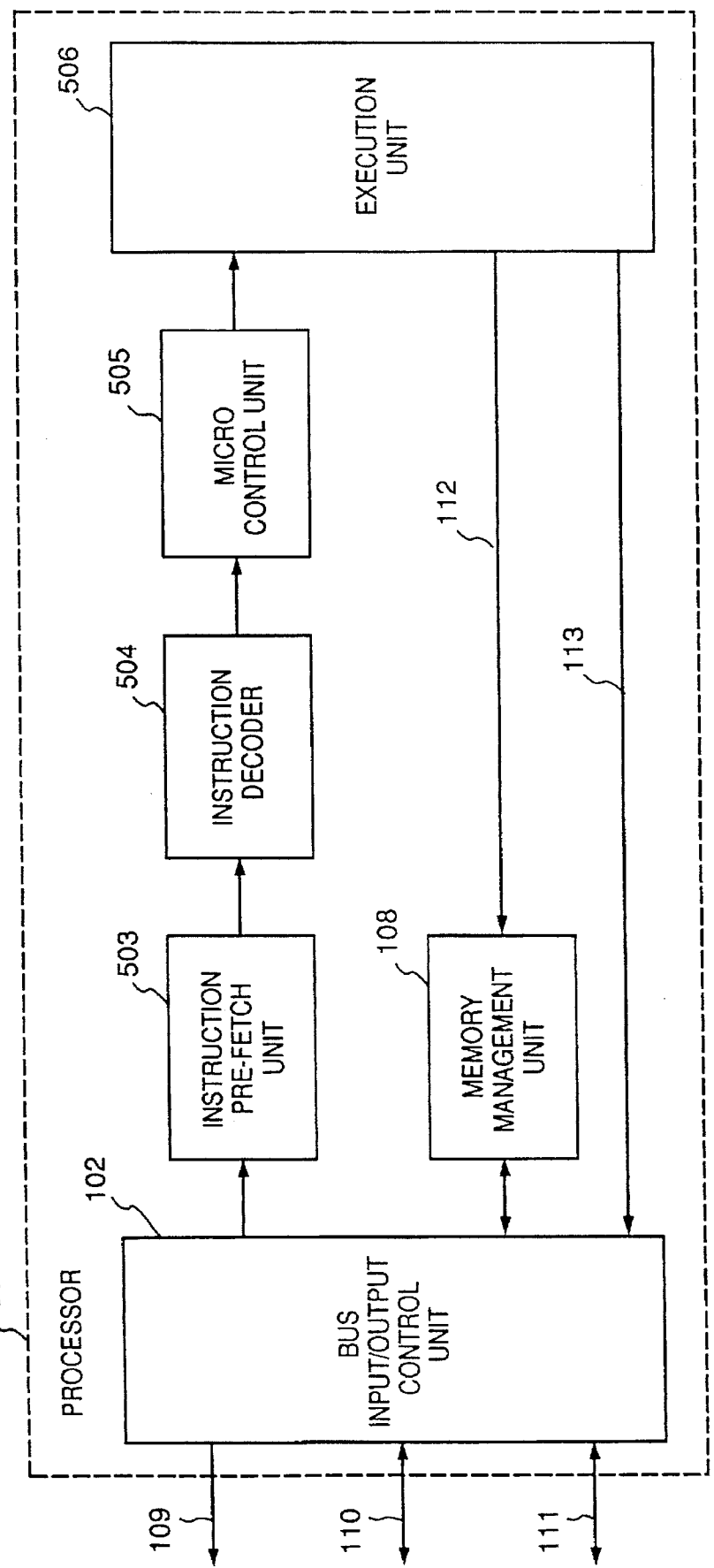
FIG. 5 is a block diagram of the conventional processor.

FIG. 1 is a block diagram of the processor of the present invention according to the first embodiment. A processor 101 comprises a bus input/output control unit 102, a decoding unit 103, an execution control unit 107, and a memory management unit 108, where the decoding unit 103 comprises a pre-fetch unit 104, an expansion unit 105, and a timing control unit 106. The execution control unit 107 includes the instruction decoder 504, the micro control unit 505, and the execution unit 506 shown in FIG. 5. Communication with an external memory or the like is performed through an address bus 109, a data bus 110, and a control bus 111. The memory management unit 108 manages memory accesses, and is controlled in accordance with the control signal 112 outputted on the basis of the execution by the execution control unit 107.

With the aforesaid construction, the processor operates as described below. It should be noted that in the following explanation, a program is a sequence of codes including instructions and operand data. Further, a code which is a component of the program, such as an instruction or operand data, is called a program code.

In order to execute a program, the program which is stored in an external memory is read through the bus input/output control unit 102, where the process is controlled by the memory management unit 108. The read program is in a form that executable program codes are compressed. Note that the program in the executable form is called "an executable program" or "an non-compressed program", and a program which is obtained by compressing the executable program is called "a compressed program", hereinafter. The processor 101 outputs an address signal which designates the storage position of the program via the address bus 109, and reads the compressed program from the memory in accordance with a memory read signal which is included in a control signal from the control bus 111. The compressed program will be called "program" hereinafter in the first embodiment. The read program is further read by the pre-fetch unit 104 through the data bus 110 and the bus input/output control unit 102. The pre-fetch unit 104 has an instruction cache memory unit 1041 or the like, and temporarily stores the read program. The program which is temporarily stored in the pre-fetch unit 104 is converted into an executable program by the expansion unit 105. The converted executable program transfer is controlled by the timing control unit 106, then transferred to the execution control unit 107. At that time, the timing control unit 106 controls timing between the execution of the instruction by the execution control unit 107 and the transmission of the program expanded at the expansion unit. The execution control unit 107 decodes the instructions as the conventional processor does, and then they are controlled and executed by the micro control unit. The execution result is outputted to the external memory or the like via an internal bus 113 and the bus input/output control unit 102. Information such as the storage position in the memory at the time is managed by the memory management unit 108.

As described above, the processor of the present invention has the decoding unit 103 including the expansion unit 105 which expands the compressed program in the up-stream of the conventional processor, and is able to execute the compressed program, generated from the compressed executable program, in real time.

Figure 6:
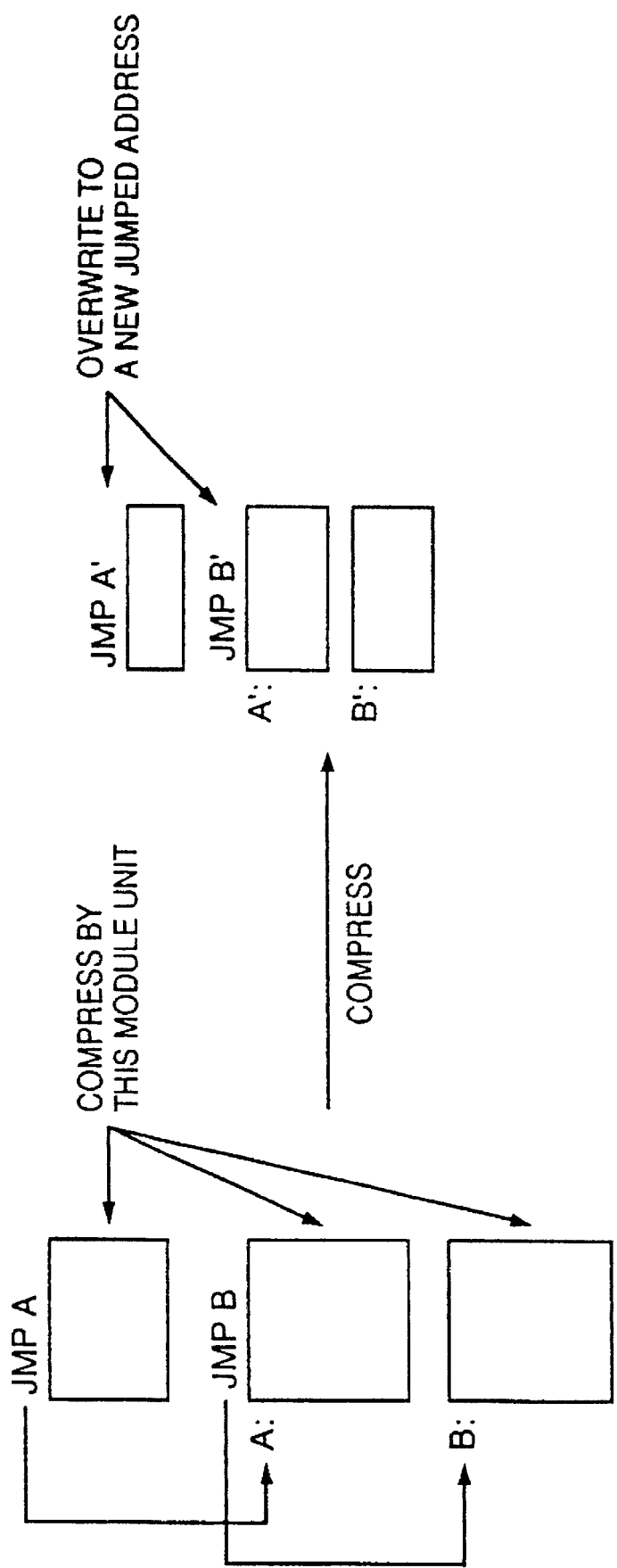
FIG. 6 is a explanatory chart of compressing a program.

It should be noted that the program to be executed is compressed by unit of several modules as shown in FIG. 6. That is, when a program is compressed, a table of branch instruction to the program to be compressed and of branching addresses is made (a table which is made at compiling and linking can be used), and a non-branching sequence of instructions is compressed as a module referring to the table. In an example in FIG. 6, two branch instructions composed of "JMP A" and "JMP B" and their two branching addresses, "A" and "B" are put in a table. At the compressing process, the program is divided into modules at the dividing points which are the former and following addresses of the branch instruction and the branching addresses "A" and "B", then each module is compressed. Since the branching addresses changes from A to A' and from B to B' because of the compression, regarding the branch instruction which branches to the addresses, branching addresses are changed to the branching addresses after the compression. In short, "JMP A" is changed to "JMP A'" and "JMP B" is changed to "JMP B'". The program to be executed is compressed in this manner. Therefore, if the branch instruction is executed during the execution of the compressed program, the branching address of the branch instruction is read as an address of the compressed program, and the object of the following fetch process is the compressed branching address. The process is the same in the second to fourth embodiments, explained below.

Figure 7:
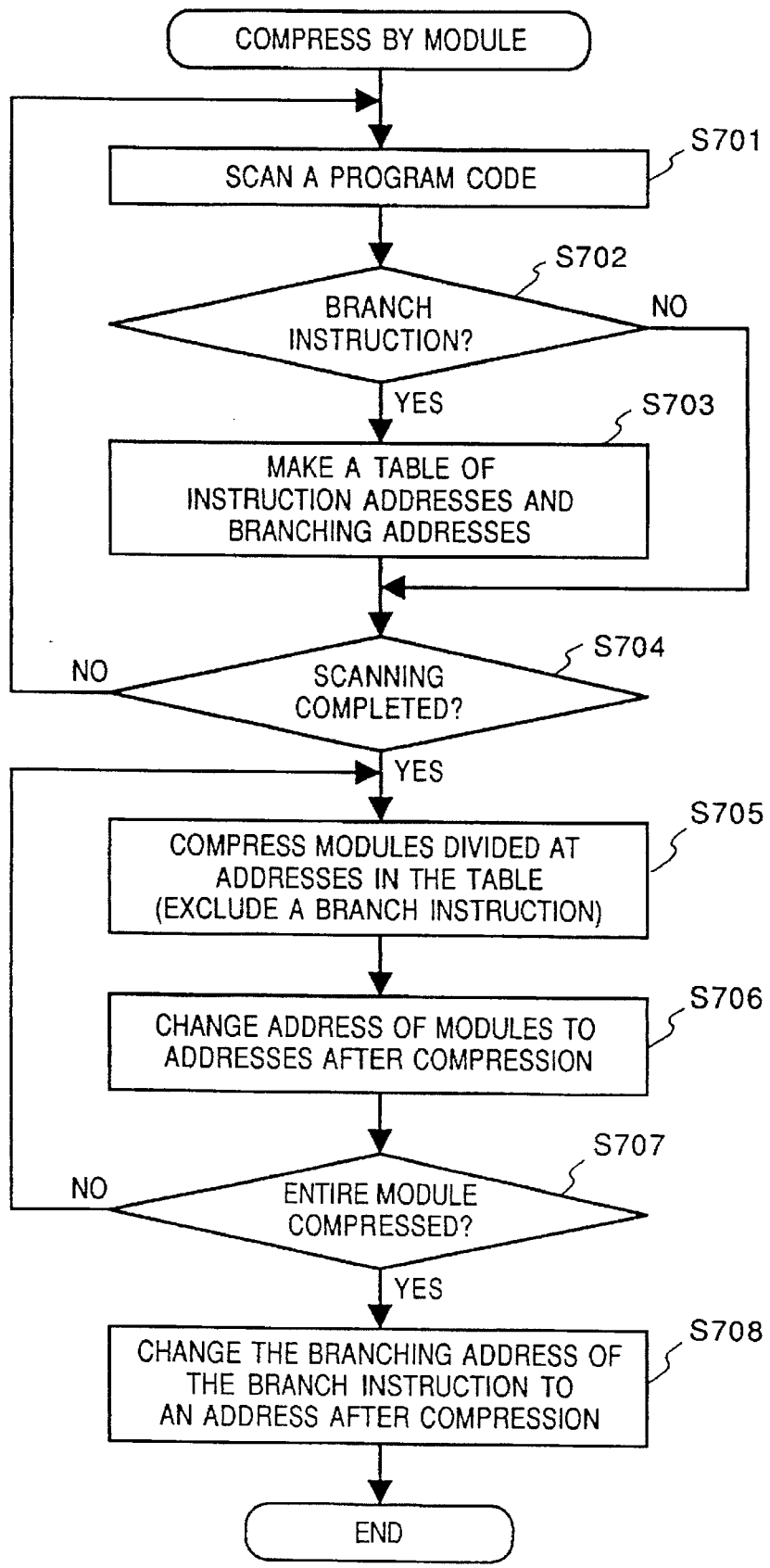
FIG. 7 shows process of compressing the program.

The compressing process of a program is shown in FIG. 7. The compressing process can be executed by a conventional computer or a computer having a processor as in the embodiment.

Note that the program is executed under an assumption that the program is entirely compressed in this embodiment, and thus the branch instruction is separately compressed by itself. Further, the program includes instruction operand data.

In FIG. 7, when the compression of the program starts, at step S701, the program code to be compressed is scanned from the beginning, and if there is any instruction, the type or kind the instruction is discriminated. At step S702, whether or not the instruction is branch instruction, is determined. If so, the address of the branch instruction and the branching address are stored in a table at step S703. Then at step S704, it is determined if the processes of steps S701 to S703 have been completed on every instruction which is included in the program to be compressed, and if not, the process repeats from step S701. If the processes have been completed, the program is compressed by module by the predetermined known method, such as LZ coding method, at step S705. The module is a unit divided at the addresses stored in the table at step S703. Note that the branch instruction itself is not compressed. After a module is compressed, an address after the compression is stored at step S706.

The processes are performed on all the modules composing the program to be compressed, then the branching address of the branch instruction (not compressed) is re-stored to the address of the module after compression which is stored at step S706 at the end. According to the above-described procedure, the program can be compressed while keeping the branching address properly.

The processor described above can be formed with one chip of integrated circuit or by discrete circuits.

[Second Embodiment]

Figure 2:
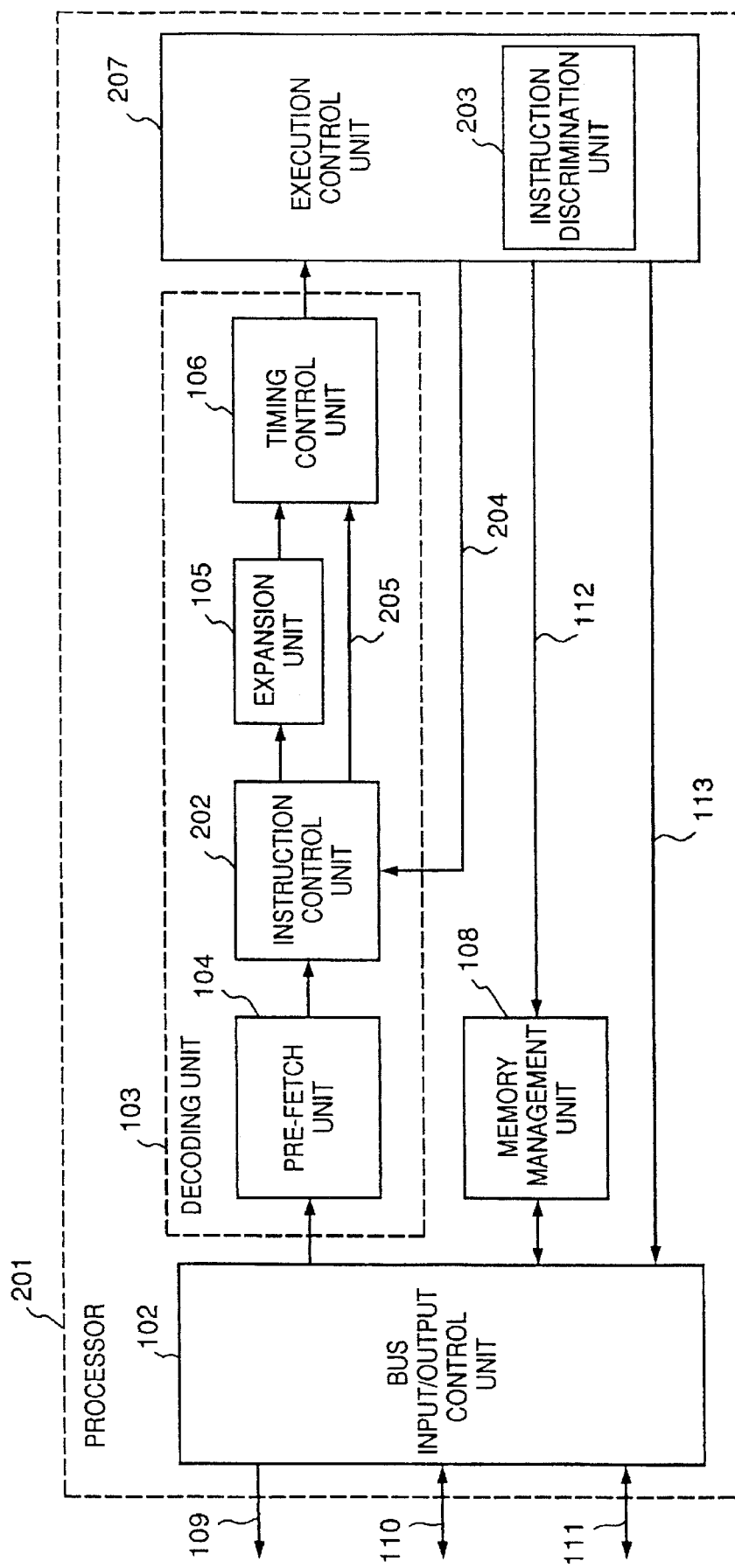
FIG. 2 is a block diagram of the processor according to a second embodiment.

FIG. 2 is a block diagram of the processor in the second embodiment. A processor 201 comprises the bus input/output control unit 102, the decoding unit 103, an execution control unit 207, and the memory management unit 108, where the decoding unit 103 comprises the pre-fetch unit 104, an instruction control unit 202, the expansion unit 105, and the timing control unit 106. Communication with an external memory or the like is performed through the address bus 109, the data bus 110, and the control bus 111. The memory management unit 108 manages memory accesses, and is controlled in accordance with the control signal 112 outputted based on the execution of a program by the execution control unit 207. The execution control unit 207 includes an instruction discrimination unit 203, and controls an instruction control unit 202 in accordance with a control signal 204 outputted based on the discrimination result.

With the above-described structure, the processor 201 operates as described below.

In order to execute a program, the program which is stored in an external memory is read through the bus input/output control unit 102 where the process is controlled by the memory management unit 108. The read program includes executable program codes and/or compressed executable program codes, which the conventional processor can not execute directly. The processor 201 outputs an address signal which designates the storage position of the program via the address bus 109, and reads the program from the memory in accordance with a memory read signal which is included in a control signal on the control bus 111.

The program read out of the memory is further read by the pre-fetch unit 104 through the data bus 110 and the bus input/output control unit 102. The pre-fetch unit 104 has an instruction cache memory unit (not shown), and temporarily stores the read program. The compressed program which is temporarily stored in the pre-fetch unit 104 is sent to the expansion unit 105 or the timing control unit 106 directly via an internal bus 205 by the instruction control unit 202.

The instruction control unit 202 decides the output control based on the control signal 204 outputted in accordance with the discrimination result by the instruction discrimination unit 203. Note that, immediately after the processor is reset, the instruction control unit 202 outputs the instruction to an internal bus 205. In other words, the instruction which is executed first right-after the reset of the processor is an instruction in an executable form (non-compressed form). The non-compressed program is executed first, then the execution control unit 207 executes an instruction indicating that the compressed program will be executed next, which is included at the end of the non-compressed program code sequence. Then the instruction discrimination unit 203 discriminates that the next instruction sequence is in the compressed form, and the instruction control unit 202 is controlled based on the control signal 204 and switches to the expansion unit 105 where the compressed instruction sequence is to be transmitted.

The compressed program which is inputted to the expansion unit 105 from the pre-fetch unit 104 via the instruction control unit 202 is converted into an executable program by the expansion unit 105, and sent to the timing control unit 106. The converted executable program is timing controlled to be outputted at the timing control unit 106, then transmitted to the execution control unit 207. At that time, the timing control unit 106 controls timing between the execution of the instruction by the execution control unit 207 and the transmission of the program expanded at the expansion unit. The execution control unit 207 decodes the instruction as the conventional processor does, then the micro control unit controls the execution control unit 207 and executes the program. The execution result is outputted to the external memory or the like via an internal bus 113 and the bus input/output control unit 102. Information such as the storage position in the memory at this time is managed by the memory management unit 108. At the end of the compressed program, an instruction indicating that a non-compressed program, namely an executable program, starts next. The instruction discrimination unit 203 controls the instruction control unit 202 based on the control signal 204, and switches to the timing control unit 106 where the instruction is to be outputted according to the instruction. As described above, the instruction control unit 202 controls the output of the instruction sequence so that the successive instruction will not be outputted to the expansion unit 105 from the pre-fetch unit 104 until one compression unit (module) is expanded and interpreted during execution of the compressed program.

Figure 8:
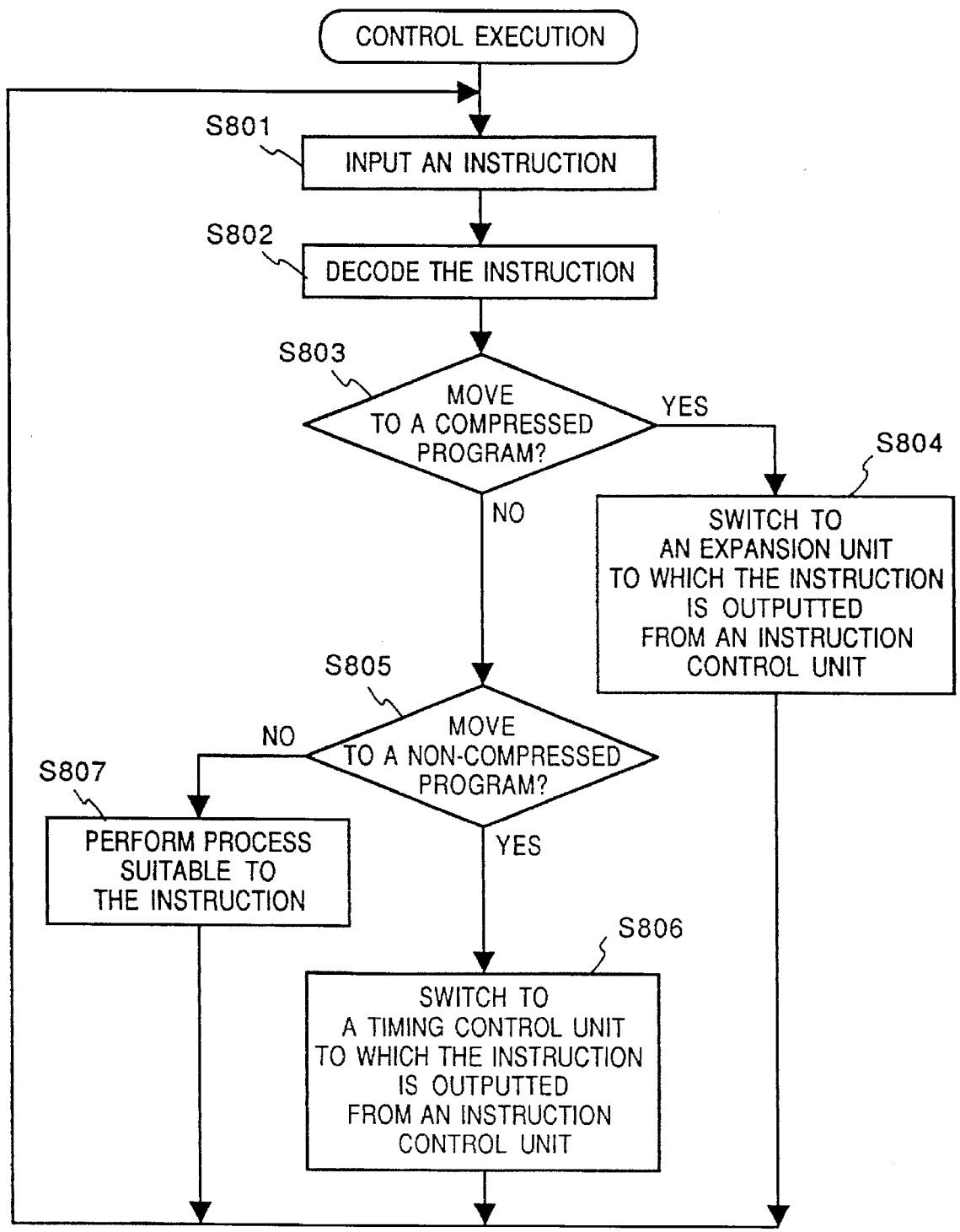
FIG. 8 illustrates a controlling procedure by an execution control unit according to the second embodiment.

The control process of the instruction control unit 202 by the execution control unit 207 is shown in FIG. 8.

In FIG. 8, an instruction is inputted at step S801, and decoded at step S802. At step S803, whether or not the decoded instruction designates the change from the non-compressed program to the compressed program is determined. If so, a control signal, which designates to output the program to the expansion unit 105, is issued to the instruction control unit 202 at step S804.

At step S805, whether or not the inputted instruction designates the change from the compressed program to the non-compressed program is detected. If so, a control signal, which designates to output the program to the timing control unit 106, is issued to the instruction control unit 202 at step S806. If the inputted instruction is neither of the above, the programs processed so as to fit to the inputted instruction at step S807.

The second embodiment shown in FIG. 2, differs from the first embodiment at a point where the compressed program and the non-compressed program can be mixed when they are executed. Regarding the branch instruction, instructions which indicates the program is in the compressed form or in the non-compressed form are added before and after the branch instruction.

As described above, the processor 201 of the present invention has the instruction control unit 202 for controlling flow of the compressed and the non-compressed programs up-stream of the processor in the first embodiment. The processor 201 further comprises the instruction discrimination unit 203 for controlling the instruction control unit 202, thereby it is possible for the processor 201 to execute a compressed instruction and a executable instruction which is a non-compressed instruction, and there is an advantage that the compressed program which is formed by compressing the executable program can be executed in real-time. Further, since the processor is able to execute a non-compressed program, a packaged application program can be also executed by the processor.

[Third Embodiment]

Figure 3:
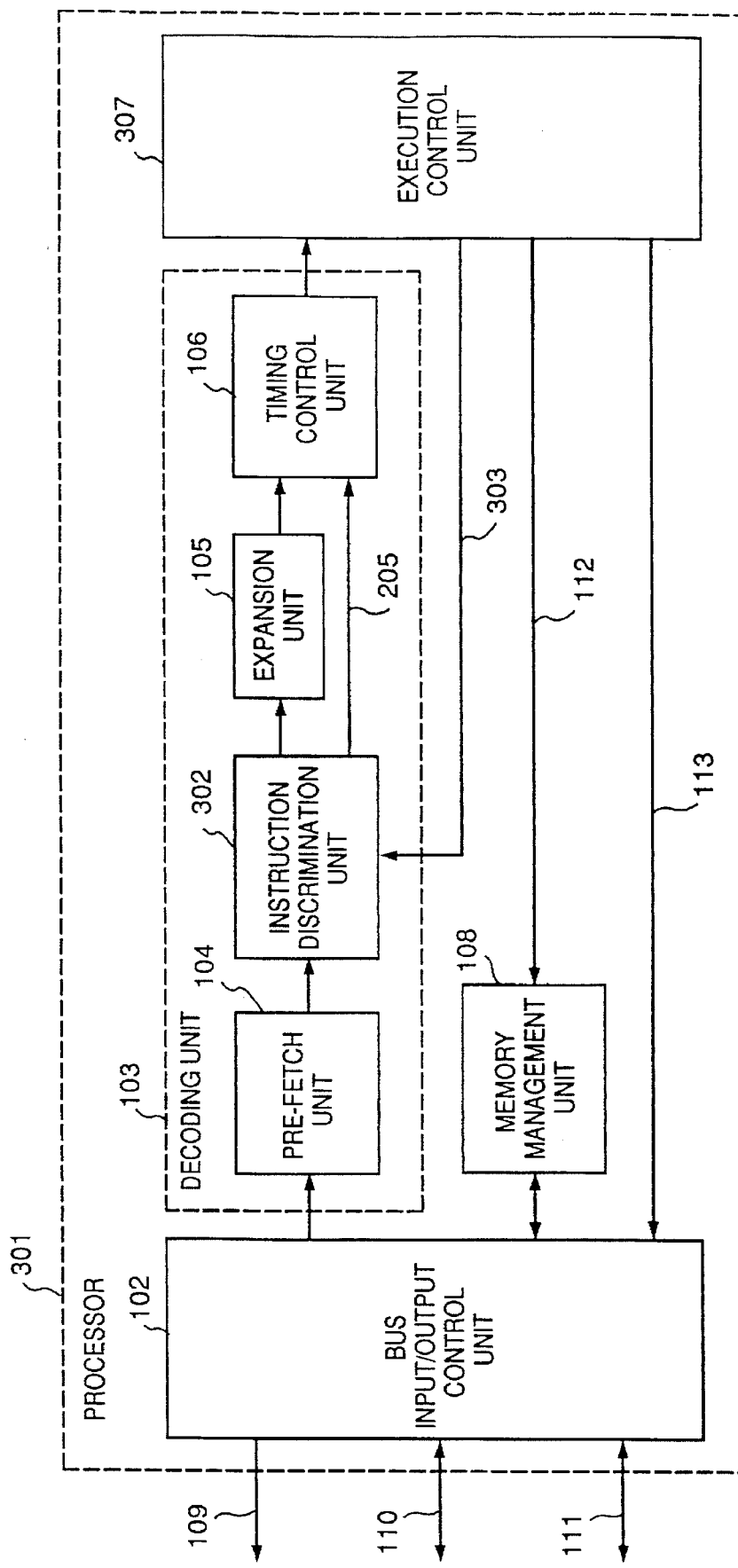
FIG. 3 is a block diagram of the processor according to a third embodiment.

FIG. 3 is a block diagram illustrating the processor in the third embodiment. The processor 301 comprises the bus input/output control unit 102, the decoding unit 103, an execution control unit 307, and the memory management unit 108, where the decoding unit 103 comprises the pre-fetch unit 104, an instruction discrimination unit 302, the expansion unit 105, and the timing control unit 106. Communication with an external memory or the like is performed through the address bus 109, the data bus 110, and the control bus 111. The memory management unit 108 manages memory accesses, and is controlled based on the control signal 112 outputted in accordance with the execution of a program by the execution control unit 307. The instruction discrimination unit 302 controls where a fetched instruction should be sent either to an internal bus 205 or to the expansion unit 105, in accordance with the discrimination result.

With the above-described structure, the processor 301 operates as described below.

In order to execute a program, the program which is stored in an external memory is read through the bus input/output control unit 102 where the process is controlled by the memory management unit 108. The read program includes executable program codes and/or compressed program codes which the conventional processor can not execute directly. When the processor 301 reads the program, it outputs an address signal which designates the storage position of the program via the address bus 109, and reads the program from the memory in accordance with a memory read signal which is included in a control signal on the control bus 111.

The read program (the executable (non-compressed) and/or the compressed program) is further read by the pre-fetch unit 104 through the data bus 110 and the bus input/output control unit 102. The pre-fetch unit 104 has an instruction cache memory (not shown), and temporarily stores the read program. The instruction which is temporarily stored in the pre-fetch unit 104 is sent to the expansion unit 105 or the timing control unit 106 directly via the internal bus 205 by the instruction discrimination unit 302. Note that immediately after the processor 301 is reset, the instruction discrimination unit 302 outputs the instruction to the internal bus 205. In other words, the instruction which is executed first right after the reset of the processor is in a non-compressed form.

The non-compressed program code is executed first, then the execution control unit 307 executes an instruction indicating that the compressed program will be executed next, which is placed at the end of the non-compressed program code sequence. The instruction is for the instruction discrimination unit 302's exclusive use, and used for switching devices to which the instruction of the program is outputted. When the instruction discrimination unit 302 receives the instruction for its exclusive use, it discriminates that a next instruction sequence is in the compressed form, and switches to the expansion unit 105 where the compressed instruction sequence is to be outputted.

The compressed program which is inputted to the expansion unit 105 from the pre-fetch unit 104 via the instruction discrimination unit 302 is converted into an executable program by the expansion unit 105, and sent to the timing control unit 106. The converted executable program is controlled timing to be outputted at the timing control unit 106, then transmitted to the execution control unit 307. At that time, the timing control unit 106 controls timing between the execution of the instruction by the execution control unit 307 and the transmission of the program expanded at the expansion unit. The execution control unit 307 decodes the instruction as the conventional processor does, then the micro control unit controls the execution control unit 307 on the basis of the decoded information and executes the program. The execution result is outputted to the external memory or the like via the internal bus 113 and the bus input/output control unit 102. Information such as the storage position in the memory at this time is managed by the memory management unit 108.

At the end of the compressed program, a special instruction indicating that a non-compressed program, namely an executable program, starts next. The instruction discrimination unit 302 switches to the timing control unit 106 where an instruction is to be sent according to the instruction. As described above, the timing control unit controls the instruction discrimination unit 302 based on a control signal 303 so that the next instruction will not be sent from the pre-fetch unit 104 to the expansion unit 105 until one compression unit is expanded during execution of the compressed program.

Figure 9:
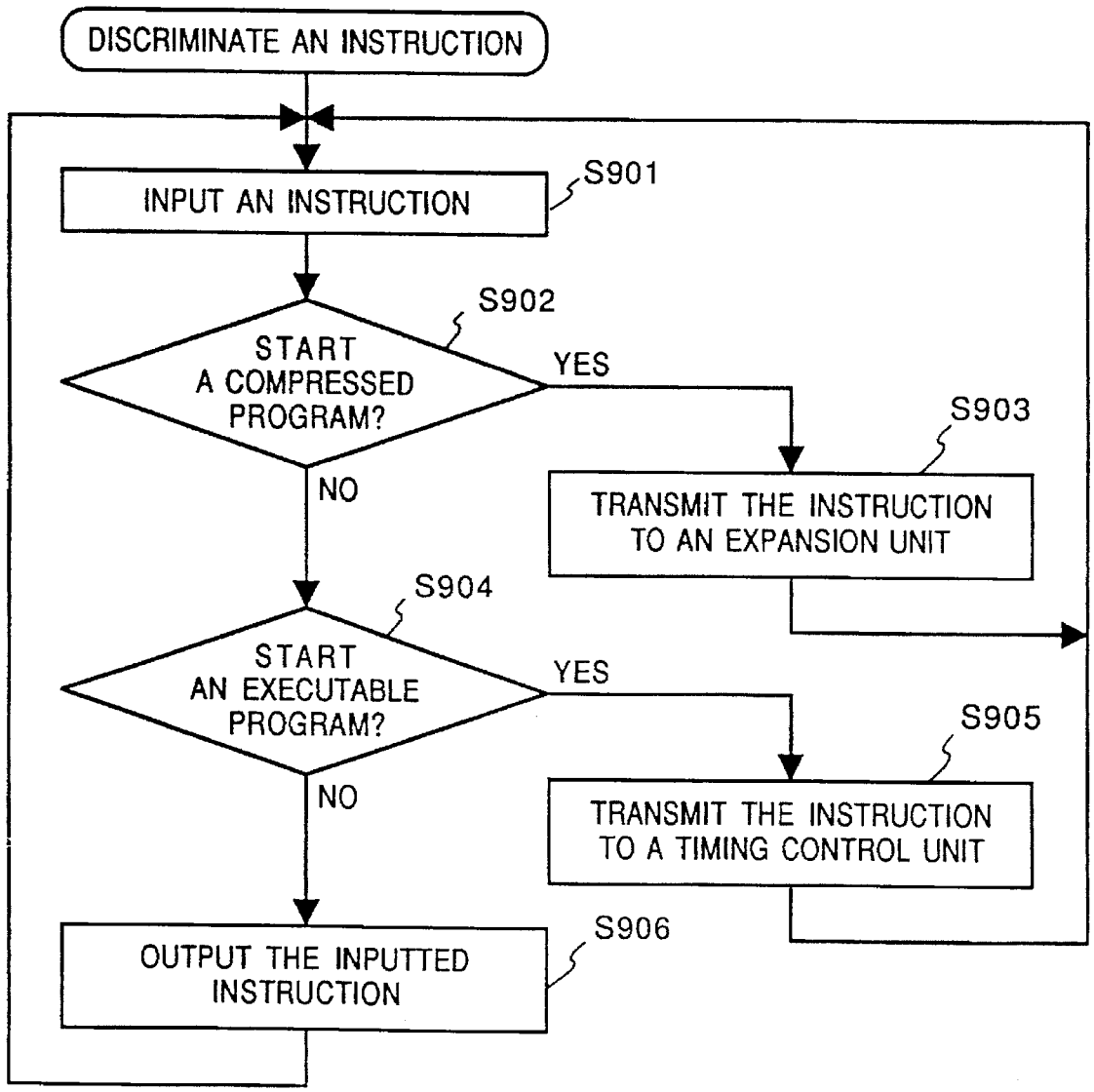
FIG. 9 illustrates a controlling procedure by an instruction control unit according to the third and fourth embodiments.

The control process by the instruction discrimination unit 302 is shown in FIG. 9. FIGS. 8–9 look similar to FIG. 8, however, differ from FIG. 8 at a point where the process in FIG. 9 is performed by the instruction discrimination unit.

In FIG. 9, when an instruction is inputted to the instruction discrimination unit 302 at step S901, then at step S902, whether or not the instruction designates the start of the compressed program, is determined. If so, at step S903, it is determined that the program codes after the instruction are to be transmitted to the expansion unit 105. Further, at step S904, whether or not the inputted instruction designates the start of the non-compressed program, namely the executable program, is determined. If so, it is determined that the program codes after the instruction are to be transmitted to the timing control unit 106 at step S905. In a case where the inputted instruction does not indicates neither of above, the program codes are kept transmitted to the unit to which the program codes have been outputted at step S906.

As described above, the processor 301 of the present invention has an instruction discrimination unit 302 for discriminating and controlling flow of the compressed and the non-compressed programs up-stream of the conventional processor. The processor 301 further uses the instruction designating a start of the compressed program and the instruction designating a start of the non-compressed program. Thereby it is possible for the processor 301 to execute a compressed instruction and a executable instruction, namely a non-compressed instruction. In addition, there is an advantage that the compressed program which is formed by compressing the executable program can be executed in real-time. Further, since the processor is able to execute a non-compressed program, a packaged application program can be also executed by the processor.

[Fourth Embodiment]

Figure 4:
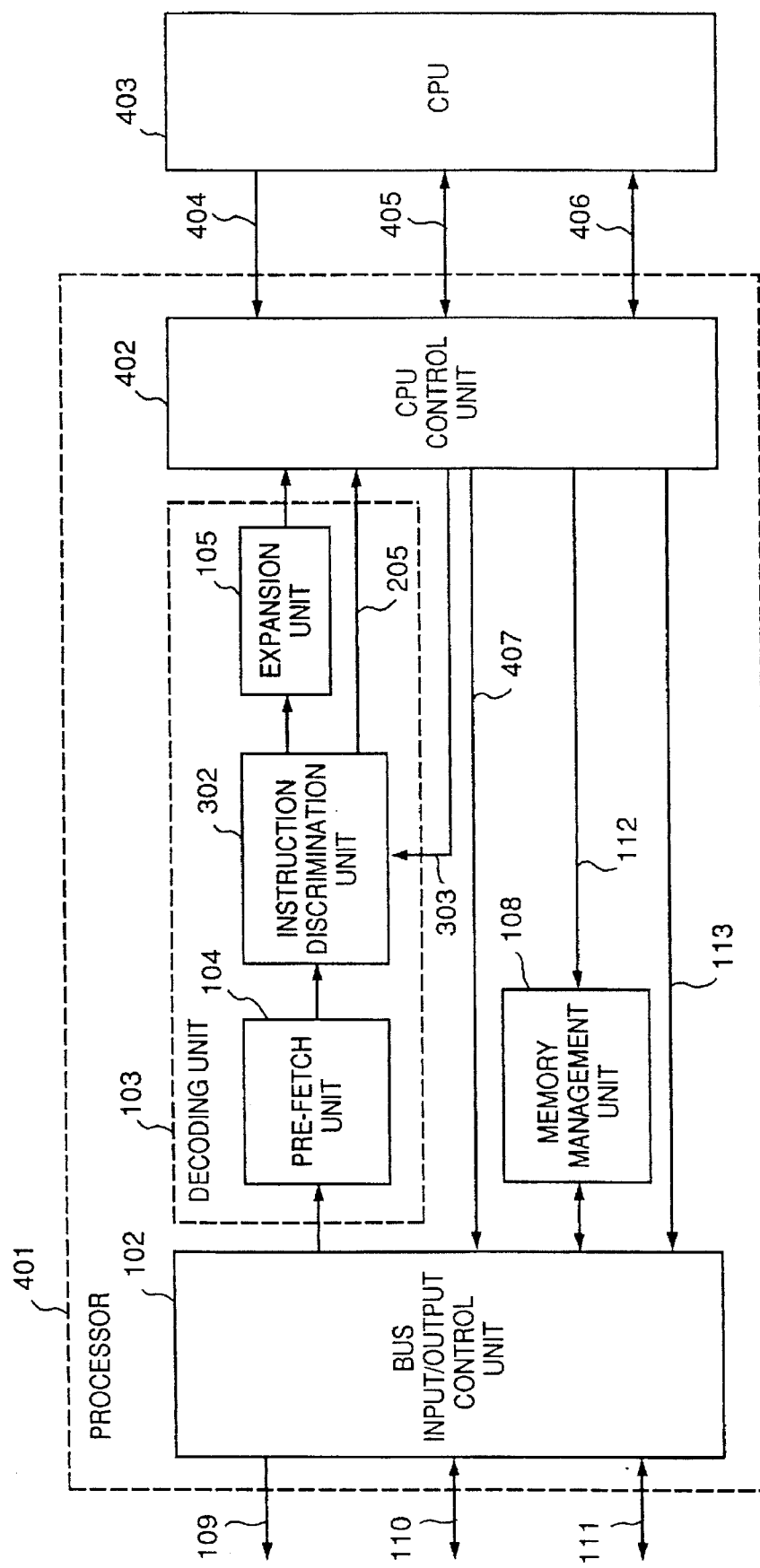
FIG. 4 is a block diagram of the processor according to a fourth embodiment.

FIG. 4 is a block diagram illustrating a processor in the fourth embodiment. The fourth embodiment explains an example of operation of an apparatus which is a combination of the processor in the third embodiment, a conventional CPU (Central Processing Unit) 403, and the processor 401.

The processor 401 comprises the bus input/output control unit 102, the decoding unit 103, the CPU control unit 402, and the memory management unit 108, where the decoding unit 103 comprises the pre-fetch unit 104, the instruction discrimination unit 302, and the expansion unit 105. Communication with an external memory or the like is performed through the-address bus 109, the data bus 110, and the control bus 111. The memory management unit 108 manages memory accesses, and is controlled in accordance with the control signal 112 outputted from the CPU control unit 402. The instruction discrimination unit 302 controls where a fetched instruction should be sent either to an internal bus 205 or the expansion unit 105 based on the discrimination result.

CPU 403 is a conventional processing unit capable of executing a non-compressed program only. An address bus 404, a data bus 405, and a control bus 406 are used for input/output to/from the CPU which is the conventional processing unit. The CPU control unit 402 interfaces to the CPU 403.

With the above-described structure, the processor 401 and the CPU 403 operate as described below.

When the CPU 403 is reset, it outputs a special address to an address bus 404. The instruction stored thereat is read via a data bus 405 by outputting a control signal 406, then interpreted and executed. The CPU control unit 402 controls the memory management unit 108 and the bus input/output control unit 102 via an internal address bus 407, the internal bus 113, and the control signal 112 to access to an external bus based on the address and control signals outputted at the time when the instruction is read. During the access, the CPU control unit 402 controls timing to outputs the instruction from the processor 401 to the CPU 403. By following the process explained above, the instruction in the memory on the external bus is read by the CPU 403 through the processor 401.

The program which is stored in the memory on the external bus includes an executable program codes and/or compressed program codes which the conventional processor can not execute directly. The program in the memory is read by the pre-fetch unit 104 through the bus input/output control unit 102. The pre-fetch unit 104 has the instruction cache memory (not shown), and temporarily stores the read program. The program codes which is temporarily stored in the pre-fetch unit 104 is sent to the expansion unit 105 or the timing control unit 106 directly via the internal bus 205 by the instruction discrimination unit 302. Note that immediately after the processor 401 is reset, the instruction discrimination unit 302 outputs the instruction to the internal bus 205. In other words, the program which is executed first right after the reset of the processor is non-compressed program.

The non-compressed program is executed first, then at the end of the instruction sequence, an instruction indicating that the compressed program will be executed next is issued. The instruction is for the instruction discrimination unit 302's exclusive use, and used for switching devices to which the instruction of the program is outputted. When the instruction discrimination unit 302 receives the instruction for its exclusive use, it discriminates that a next instruction sequence is in the compressed form, and switches to the expansion unit 105 where the compressed instruction sequence is to be outputted.

The compressed program which is inputted to the expansion unit 105 from the pre-fetch unit 104 via the instruction discrimination unit 302 is converted into an executable program by the expansion unit 105, and sent to the CPU control unit 402. The converted executable program is controlled timing to output the program at the CPU control unit 402, then transmitted to the CPU 403. The CPU 403 decodes the instruction, then the micro control unit controls the CPU control unit 402 and executes the program. The execution result is outputted to the external memory or the like via the memory management unit 108 and the bus input/output control unit 102 by controlling the CPU control unit 402 through the data bus 405. Information such as the storage position in the memory at this time is managed by the memory management unit 108.

At the end of the compressed program, a special instruction indicating that a non-compressed program, namely an executable program, starts next. The instruction discrimination unit 302 switches to the internal bus 205 where an instruction is to be sent according to the instruction. As described above, the instruction discrimination unit 302 is controlled in accordance with a control signal 303 outputted from the CPU control unit 402 so that the next instruction will not be sent from the pre-fetch unit 104 to the expansion unit 105 until one compression unit is expanded during execution of the compressed program.

As described above, the apparatus of the present invention has the processor 401 as a pre-processor in the up-stream of the conventional processor. The processor 401 contains the instruction discrimination unit 302 for discriminating and controlling flow of the compressed and the non-compressed programs. Thereby it makes it possible to use the instruction designating a start of the compressed program the instruction designating a start of the non-compressed program by combining the conventional processor and the processor 401 as the pre-processor. In addition, there is an advantage that the compressed program which is formed by compressing the executable program can be executed in real-time. Further, since the processor is able to execute a non-compressed program, a ready-made program can be also executed by the processor. Regarding the conventional processor, one which is in the computer market can be employed.

The present invention is not limited to the above embodiments and various changes and modifications can be made within the spirit and scope of the present invention. Therefore, to apprise the public of the scope of the present invention, the following claims are made.

What is claimed is:

1. A processor comprising:
   input means for inputting program codes including compressed program codes;
   decoding means for decoding the compressed program codes inputted by said input means into non-compressed program codes;
   execution means for executing the non-compressed program codes decoded by said decoding means;
   control means for controlling timing between the execution of the non-compressed program codes by said execution means and transmission of decoded program codes from said decoding means to said execution means; and
   designating means for designating an address of compressed program codes which will be inputted next by said input means, based on the program codes executed by said execution means,
   wherein said decoding means decodes compressed program codes and said executing means executes decoded program codes in parallel.

2. The processor according to claim 1, wherein said decoding means comprises storage means for storing the compressed program codes inputted by said input means by a predetermined amount, and expansion means for expanding the compressed program codes stored in said storage means into the non-compressed program codes.

3. The processor according to claim 1, further comprising discrimination means for discriminating whether or not the program codes inputted by said input means are the compressed program codes, wherein said decoding means decodes the compressed program codes in a case where the inputted program codes are determined as the compressed program codes by said discrimination means.

4. The processor according to claim 3, wherein said discrimination means discriminates whether the inputted program codes are compressed ones or the non-compressed ones by notifying instructions which designate a start of the compressed program codes and which designate an end of the compressed program codes, where the instruction is included in the program codes.

5. The processor according to claim 4, wherein said discrimination means discriminates whether the inputted program codes are the compressed ones or the non-compressed ones by executing an instruction, which designates the beginning of the compressed program codes or the end of the compressed program codes, by said execution means.

6. The processor according to claim 4, wherein said discrimination means discriminates whether the inputted program codes are the compressed ones or the non-compressed ones by discriminating an instruction which designates a start of the compressed program codes or an end of the compressed program codes before the execution by said execution means.

7. The processor according to claim 1, wherein the compressed program codes are formed by compressing a program which is composed of modules as a unit, which is divided at an address of a branch instruction and a branching address branched in accordance with the branch instruction.

8. A processor comprising:
   input means for inputting program codes including compressed program codes stored in memory means and non-compressed program codes;
   discrimination means for discriminating whether a program code inputted by said input means is a compressed program code or a non-compressed program code;
   decoding means for decoding the compressed program codes inputted by said input means into non-compressed program codes on the basis of a discrimination result provided by said discrimination means;
   execution means for executing the non-compressed program codes decoded by said decoding means and the non-compressed program codes inputted by said input means;
   control means for controlling timing between the execution of the non-compressed program codes by said execution means and transmission of non-compressed program codes from said decoding means to said execution means; and
   designating means for designating an address in the memory means of compressed program codes to be inputted by said input means in accordance with the program codes executed by said execution means and the discrimination result provided by said discrimination means,
   wherein said decoding means decodes compressed program codes and said executing means executes decoded program codes in parallel.

9. The processor according to claim 8, wherein said decoding means comprises storage means for storing the compressed program codes inputted by said input means by a predetermined amount, and expansion means for expanding the compressed program codes stored in said storage means.

10. The processor according to claim 8, wherein the compressed program codes are formed by compressing the program which is composed of modules as units divided at an address of a branch instruction and a branching address branched in accordance with the branch instruction.

11. A processor comprising:
    input means for inputting program codes including compressed program codes, which is composed of modules as units divided at an address of a branch instruction and a branching address branched in accordance with the branch instruction, and non-compressed program codes;

discrimination means for discriminating whether the input program code, which is inputted by said input means, is the compressed program codes or the non-compressed program codes;

storage means for storing the program codes inputted by said input means by a predetermined amount of the program codes;

decoding means for decoding the program codes stored in said storage means into non-compressed program codes;

execution means for executing the non-compressed program codes decoded by said decoding means and the non-compressed program codes inputted by said input means;

timing control means for controlling timing to input the program codes decoded by said decoding means to said execution means; and designating means for designating an address of the compressed program codes inputted by said input means in accordance with the program codes executed by said execution means and the discrimination result by said discrimination means.

12. A processor comprising:

a bus input/output control unit for inputting program codes from and outputting execution result to an external bus;

a decoding unit for decoding compressed program codes inputted from said bus input/output control unit into non-compressed program codes;

an instruction execution unit for interpreting and executing the non-compressed program codes;

a timing control unit for controlling timing between the execution of the non-compressed program codes by said instruction execution unit and transmission of decoded program codes from said decoding unit to said instruction execution unit; and a memory management unit for managing accesses to a memory, wherein said decoding unit decodes compressed program codes and said instruction unit executes non-compressed program codes in parallel.

13. The processor according to claim 12, wherein said decoding unit comprises a pre-fetch unit for pre-fetching a compressed instruction from said bus input/output control unit and operand data, and an expansion unit for converting the pre-fetched compressed instruction and operand data into an executable instruction and operand data.

14. The processor according to claim 12, wherein said decoding unit comprises a pre-fetch unit for receiving an instruction from said bus input/output control unit and operand data, and an expansion unit for converting a compressed instruction and operand data into an executable instruction and operand data, wherein said instruction execution unit comprises an instruction discrimination unit for discriminating whether an inputted instruction is an instruction indicating a start of the compressed program codes or indicating a start of non-compressed program codes.

15. The processor according to claim 14, wherein instruction and operand data inputted from said pre-fetch unit is, for the compressed program, transferred to said expansion unit, converted into a non-compressed program, and transferred to said instruction execution unit after being controlled by said timing control unit, and for an executable program, namely the non-compressed program, outputted to an internal bus, and transferred to the instruction execution unit after being controlled by said timing control unit.

16. The processor according to claim 12, wherein said decoding unit comprises a pre-fetch unit for receiving an instruction from said bus input/output control unit and operand data, and an instruction discrimination unit for discriminating whether the inputted program codes are the compressed program codes or the non-compressed program codes, namely executable program codes.

17. The processor according to claim 16, wherein said instruction discrimination unit discriminates whether it transfers the instruction from said pre-fetch unit and the operand data to said instruction execution unit after outputting them to said expansion unit and controlling timing by said timing control unit, or it transfers the instruction and the operand data to said instruction execution unit after outputting to the external bus and control timing by said timing control unit, based on a start instruction, which is included in the instruction and the operand data, of the compressed program codes and of the non-compressed program codes.

18. The processor according to claim 16, wherein, while the compressed program codes are being expanded, said instruction discrimination unit is controlled on the basis of a control signal from said timing control unit so that the following instruction and operand data are not outputted to the expansion unit or the internal bus.

19. A processor which is configured up-stream of CPU, and is a pre-processor of the CPU, comprising:

a CPU control unit, configured upstream of the CPU which interprets and executes an instruction by micro instruction control, for synchronizing the processor with said CPU on the basis of an address signal from said CPU, a control signal and a data signal;

a bus input/output control unit for inputting/outputting instruction data and data from/to an external bus;

a memory management unit for managing accesses to a memory; and a decoding unit, wherein said decoding unit comprises a pre-fetch unit for receiving an instruction and operand data from said bus input/output control unit, an instruction discrimination unit for discriminating whether the instruction and operand data are compressed program codes or non-compressed program codes, namely executable program codes, and for switching devices to which the instruction and the operand data are to be outputted, and an expansion unit for expanding the instruction and the operand data.

20. The processor according to claim 19, wherein said instruction discrimination unit discriminates where the instruction from said pre-fetch unit and the operand data are outputted on the basis of an instruction designating a start of the compressed program codes and of the executable program codes.

21. The processor according to claim 20, wherein, in a case where the discrimination result of the instruction indicates the compressed program codes, said instruction discrimination unit outputs the instruction and the operand data from said pre-fetch unit to said expansion unit, and transfers the expanded instruction and data to said CPU after synchronizing the expansion result at said CPU control unit, whereas in a case where the discrimination result of the instruction indicates the executable program, outputs to an internal bus and transfers to said CPU after synchronizing the processor with said CPU at said CPU control unit.

22. The processor according to claim 21, wherein, while the compressed program codes are being expanded, said CPU unit issues a control signal to said instruction discrimination unit and controls it so that a next instruction and operand data will not be outputted to said expansion unit or the internal data bus.

23. A processor apparatus comprising:
- a bus input/output control unit for inputting program codes from and outputting execution result to an external bus;
- a decoding unit for decoding compressed program codes inputted from said bus input/output control unit into non-compressed program codes;
- an instruction execution unit for interpreting and executing the non-compressed program codes;
- timing control unit for controlling timing between the execution of the non-compressed program codes by said instruction execution unit and transmission of decoded program codes from said decoding unit to said instruction execution unit; and
- a memory management unit for managing an access to a memory,
- wherein the processor is an electrical device which contains each of said units in one chip, and execution of the non-compressed program codes and decoding of the compressed codes are performed in parallel.

24. The processor according to claim 1, further comprising external memory means for storing program codes to be inputted into said decoding means by said input means.

25. The processor according to claim 8, further comprising external memory means for storing program codes to be inputted into said discriminating means by said input means.

26. The processor according to claim 11, further comprising external memory means for storing program codes including compressed program codes to be inputted by said input means.

27. The processor according to claim 12, further comprising an external memory unit for storing program codes to be inputted into said decoding unit by said input unit.

28. The processor according to claim 19, further comprising an external memory unit for storing instruction data and data to be inputted by said bus input/output control unit.

29. The processor according to claim 23, further comprising an external memory unit for storing program codes to be inputted into said decoding unit by said input unit.

* * * * *